United States Patent
Choi et al.

(10) Patent No.: US 9,282,591 B2
(45) Date of Patent: Mar. 8, 2016

(54) METHOD FOR MANUFACTURING A FLEXIBLE HEATER

(75) Inventors: Jae Sik Choi, Hoeilaart (BE); Jean-Michel Granes, Cournon (FR); Pierre-Francois Tardy, Compiegne (FR)

(73) Assignee: INERGY AUTOMOTIVE SYSTEMS RESEARCH (SOCIETE ANONYME), Brussels (BE)

( * ) Notice: Subject to any disclaimer, the term of this patent is extended or adjusted under 35 U.S.C. 154(b) by 281 days.

(21) Appl. No.: 13/883,468

(22) PCT Filed: Oct. 28, 2011

(86) PCT No.: PCT/EP2011/068945
§ 371 (c)(1),
(2), (4) Date: Jul. 23, 2013

(87) PCT Pub. No.: WO2012/059417
PCT Pub. Date: May 10, 2012

(65) Prior Publication Data
US 2013/0298385 A1    Nov. 14, 2013

(30) Foreign Application Priority Data

Nov. 4, 2010 (EP) .................................. 10189983

(51) Int. Cl.
*H05B 3/00* (2006.01)
*H05B 3/36* (2006.01)
*H01C 17/02* (2006.01)

(52) U.S. Cl.
CPC .................. *H05B 3/36* (2013.01); *H01C 17/02* (2013.01); *H05B 2203/017* (2013.01); *Y10T 29/49083* (2015.01); *Y10T 29/49087* (2015.01); *Y10T 29/49101* (2015.01)

(58) Field of Classification Search
CPC .............. H05B 3/10; H05B 3/12; H05B 3/36; H05B 3/44; H05B 3/48; H05B 3/52; H05B 3/56; E21B 36/04; E21B 43/2401; E21B 43/243; Y10T 29/49002; Y10T 29/49073; Y10T 29/49083; Y10T 29/49089; Y10T 29/49091
USPC ................ 29/592.1, 604–607, 611, 614, 615; 219/534, 535, 542, 544, 546, 548; 392/441–464

See application file for complete search history.

(56) References Cited

U.S. PATENT DOCUMENTS

| 2,905,919 | A | * | 9/1959 | Lorch et al. .................... 338/224 |
| 4,967,057 | A |   | 10/1990 | Bayless et al. |
| 5,271,085 | A |   | 12/1993 | Carballo |
| 5,444,228 | A |   | 8/1995 | Gelus |
| 5,928,548 | A |   | 7/1999 | Johansson |
| 8,791,396 | B2 | * | 7/2014 | Burns et al. .................... 219/542 |
| 8,939,207 | B2 | * | 1/2015 | De St. Remey et al. ... 166/272.1 |
| 8,943,686 | B2 | * | 2/2015 | Hartford et al. ................. 29/869 |
| 2010/0220984 | A1 |   | 9/2010 | Potier et al. |
| 2013/0125531 | A1 | * | 5/2013 | Choi ............................... 60/274 |

FOREIGN PATENT DOCUMENTS

| CN | 1157688 A | 8/1997 |
| FR | 2 872 964 | 1/2006 |
| WO | 2008 138960 | 11/2008 |

OTHER PUBLICATIONS

European Search Report Issued Feb. 25, 2011 in Application No. EP 10 18 9983 Filed Nov. 4, 2010.
International Search Report Issued Feb. 1, 2012 in PCT/EP11/68945 Filed Oct. 28, 2011.

* cited by examiner

*Primary Examiner* — Paul D Kim
(74) *Attorney, Agent, or Firm* — Oblon, McClelland, Maier & Neustadt, L.L.P.

(57) ABSTRACT

A method for manufacturing a flexible heater that has a resistive track enclosed in two sheets of electrically insulating plastic material is provided. The resistive track of the flexible heater has electrical connections to which electrical wires are connected.

12 Claims, No Drawings

METHOD FOR MANUFACTURING A FLEXIBLE HEATER

The present application relates to a method for manufacturing a flexible heater. It also relates to the use of such a heater in a urea tank, and more particularly, in/on a base plate intended for such a tank.

Legislations on vehicles and trucks emissions stipulate, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally urea) solution and also a device for metering the desired amount of additive and injecting it into the exhaust line.

Given that the aqueous urea solution generally used for this purpose (eutectic 32.5 wt % urea solution) freezes at −11° C., it is necessary to provide a heating device to liquefy the solution in order to be able to inject it into the exhaust line in the event of starting in freezing conditions.

Patent application WO 2008/138960 in the name of the applicant describes a urea tank and base plate with an integrated heating element. The integrated heating element comprises at least one flexible heating part. Preferably, the flexible part is a flexible heater, that is to say that it comprises at least one resistive track inserted between two flexible films or affixed to a flexible film. Generally, it is inserted in between two electrical insulating sheets which may be based on silicone or on another plastic material which is corrosion resistant to urea like a fluoropolymer for instance.

Such heaters which are commercially available are generally of two different kinds: either their resistive track is a metallic wire, or it is a metallic tray (array) obtained by the chemical etching of a metallic foil. In any case, said resistive track is intended to be electrically connected to an external power source and this is generally done by means of electrical wires which have to be soldered to said resistive track.

U.S. Pat. No. 5,444,228 describes such a flexible heater in which a resistive track is affixed between two sheets of PVC, polyester, polyimide, silicone or the like and in which connecting strips are connected to an electrical power source notably through soldering of electrical wires. This document is however more specific to home electric appliance like pressing irons. Hence, this document does not address the problem of corrosion protection of the wire connections, while such a problem definitely exists with urea and with the conventional conductive metals used for the resistive track and for soldering.

Several companies offer for sale, flexible heaters which are overall corrosion resistant, including their lead wire connections. However, little information is available on the way the lead wire connections are corrosion protected, except the fact that the protective material may consist in vulcanized silicone rubber: see for instance the commercial information on Silicone Rubber Flexible Heaters from the company TEMPCO available on the Internet. Besides, it is worth noting that usually, silicone flexible heaters are not used for wet conditions.

U.S. Pat. No. 5,215,801 relates to the protection of electronic devices (more specifically: of circuit boards) by encapsulation with a viscous silicone composition which is flow coated over the connections (i.e. merely put over and allowed to spread by gravity) and which is thereafter cured at high temperature to harden.

The drawback of such a solution is that much insulation material is wasted (since it is not constrained in a given area) and that the curing time is long, which makes such a process economically unviable for cheaper materials like flexible heaters.

The present invention especially aims at solving this problem by providing a method suitable for protecting the electrical connections of a flexible heater on an industrial scale, which is fast and consumes less material.

Therefore, the present application relates to a method for manufacturing a flexible heater comprising a resistive track enclosed in two sheets of electrically insulating plastic material, said track comprising electrical connections to which electrical wires are connected, the method comprising the steps of:
  enclosing the resistive track in the two sheets of electrically insulating plastic material
  connecting the electrical wires to the electrical connections of the resistive track
  putting an open mould around the connection area
  injecting a liquid casting formulation into said mould
  curing said composition
  removing the mould.

The qualifier "flexible" is in fact understood to mean "easily deformable", this generally being in a reversible manner. Generally, this corresponds to a flexural rigidity (defined as being equal to $(Eh^3)/(12(1-v^2))$ where E is the Young's modulus of the flexible heater measured according to the ASTM D790-03 standard, h is its thickness and v is the Poisson's ratio of its constituent material) below 4000 N.m; preferably, in the context of the invention, the rigidity of the flexible part is less than or equal to 1000 N.m, or 100 N.m or even 10 N.m and most particularly preferably, less than or equal to 1 N.m.

According to the invention, the terms "flexible heater" intend to designate a heater comprising one or more resistive track(s) placed between two sheets or films (that is to say two substantially flat supports, the material and thickness of which are such that they are flexible) of electrically insulating plastic material. These sheets are generally similar or even identical and they are preferably made of a plastic (although any other insulating material may be suitable) and, in particular, of an elastomer. In the flexural rigidity calculation defined above, the Poisson's ratio will preferably be taken to be that of the constituent material of these sheets or films.

The sheets of the invention may be made of any suitable electrically insulating plastic material like a silicone resin, a polyolefin (polyethylene or polypropylene), a thermoplastic elastomer (or TPE), a polyester, a polyimide (such as the KAPTON® resin), etc. Preferably, they are based on silicone, polyolefin or TPE considering the fact that polyester and polyimide have a lower resistance to urea, particularly at high temperature. Preferably, these sheets are based on a silicone composition i.e. a type of silicone material which is formed by branched, cage-like oligosiloxanes with the general formula of $RnSiXmOy$, where R is a non reactive substituent, usually Me or Ph, and X is a functional group like H, OH, Cl or OR. These groups are further condensed to give highly crosslinked, insoluble polysiloxane networks.

Silicone resins are generally prepared by hydrolytic condensation of various silicone precursors. Methyl, phenyl-methyl or fluoro silicones with or without vinyl sites cured with a peroxide or with a catalyst (Platinum for example) can be used. Fillers, protectors and colorants could be added and any other ingredients as silanol or acidity captors.

Silicone sheets are available commercially namely at the company Fenner Precision.

The resistive track(s) may be based on metal, carbon, etc. or even a combination of such conductive materials. They are generally metallic (and most particularly preferably, made of a urea-resistant metal such as a stainless steel). If there are several of them, these tracks are preferably connected in parallel so that if one of the tracks is damaged, it does not impede the operation of the other tracks. Each resistive track, the case being, comprises electrical connections i.e. a part (portion) of larger surface area in order to allow the soldering of electrical wires on them. The term "wires" has to be understood broadly as designating any wire, bar or other conducting device, generally of elongated shape, allowing the connection to a power (energy) source.

The flexible heater may comprise several superposed layers of resistors (resistive tracks). It may also comprise a glass-fiber coating on at least one side to improve its mechanical strength.

Stainless steel resistive track(s) sandwiched between two silicone resin sheets, one of which being eventually covered with a network of glass fibers, give good results in the context of the invention.

Preferably, the flexible heater of the invention comprises at least two resistive tracks which are interdigitated (i.e. interwoven) in order to spare space and material. Such an embodiment is also advantageous also outside the scope of the present invention.

The flexible heater may be made by any known technique. One method that gives good results consists in sandwiching at least one metal track between two uncured silicone sheets and in co-vulcanizing the two sheets.

Preferably, one of the silicone sheets has holes corresponding to the places where the electrical connections of the resistive track are located. In a preferred embodiment (which is advantageous also outside the scope of the present invention), the respective size and shape of the electrical connections (soldering area) and of these holes are such that even if during laminating, there is some shift occurring, there is still enough soldering material available on the entire surface of the hole.

The adhesion between the plastic sheets and the resistive track(s) is preferably promoted in some other way, for instance by adapting the composition of said sheets (so that they integrate an adhesion promoter) and/or by applying glue on the track. One method that gives good results (also independently of the present invention) consists in providing the metal track with perforations (separate from those required for the electrical connections) in order to obtain a mechanical anchoring once the sheets are laminated with track in between them. In this embodiment, the perforations are filled with electrically insulating plastic material so as to interconnect the two sheets of electrically insulating plastic material. Preferably, these perforations are micro perforations having a diameter preferably below 1 mm but at least equal to the surface tension of the acid used for etching the metallic foil. Such (micro)perforations are preferably present especially in the soldering area, where the track is wider/has a larger surface area than elsewhere.

According to the invention, electrical wires are connected to the exposed (not covered by the sheets but corresponding to holes/openings into it) electrical connections of the resistive track. This connection may be made by means of screws or other mechanical fixing means which are electrically conductive, or by soldering or brazing. The present invention gives good results with soldering.

According to the invention, a liquid casting (thermosetting resin) composition is used for protecting the electrical connections of the heater. The synthetic resins that can be used in the invention include polyurethane resin, epoxy resin, unsaturated polyester resin and silicone resin. Preferably, it is a silicone resin and more preferably, a silicone composition based on at least two components which are mixed right before use, preferably during injection of the composition into the mould. In order to promote/induce thermosetting, preferably, a catalyst is used, like a platinum one for instance. Silicone compositions that give good results are those commercialized under the name QSil218 by ACC Silicones. A photo-reticulation can also assist the chemical reticulation if required.

Once the wires are connected to the resistive track, an open mould is put around the connection area. This is preferably done in a way such as to define a leak tight space/cavity around (on top of, in fact . . . ) the connection in order to be able to constrain there a liquid casting composition until it is cured (hardened).

Of course, the mould is "open" which means it comprises an opening for injecting the liquid composition, said opening being located in a place such and/or being closable such that the required leak tightness can be achieved.

For injecting the liquid casting composition, a specific device (pump) might be required, like a pump based on the endless piston principle. Its operating principle can be compared with an endless piston (screw) that conveys the product from the suction end to the discharge end, building up a differential pressure in the process.

Generally, the curing of the casting composition is done into a heated area (oven) so as to speed it up. The vulcanization (curing) can be done at room temperature depending of the product chosen. However, in order to speed up said curing, the curing temperature is preferably of at least 50° C., even more preferably, of at least 80° C. and generally, not exceeding 150° C., preferably not 120° C. in order to prevent degradation of the heater. A temperature of about 100° C. gives good results. The curing time at high temperature is preferably of at most a few minutes, preferably of at most one minute. With the above mentioned QSil218 silicone composition, it as about 1 minute at 100° C.

For mass/industrial production, the steps of injecting and curing the liquid casting composition can be made while the heater is on a carrier, the speed of which is preferably adapted in order to have the required curing time into the oven.

The present invention also relates to the use of a flexible heater as described above in a urea tank and more specifically, in or on a base plate thereof.

To this end, the present invention relates to a method for connecting a flexible heater to an SCR module (and more specifically: to the base plate of the urea tank thereof) according to which the electrical wires which have been connected to the resistive track of the heater and protected against corrosion as described above, are connected to a power source of the vehicle before or after the fixation of the flexible heater in or on the tank.

The term "urea" is understood to mean any, generally aqueous, solution containing urea. The invention gives good results with eutectic water/urea solutions for which there is a standard quality: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the Adblue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

The urea tank according to the invention may be made from any material, preferably one that is chemically resistant to urea. In general, this is metal or plastic. Polyolefins, in particular polyethylene (and more particularly HDPE or high-density polyethylene), constitute preferred materials.

This tank may be produced by any conversion processes known in the case of hollow bodies. One preferred processing method, in particular when the tank is made of plastic, and in particular HDPE, is the extrusion-blow moulding process. In this case a parison (in one or more parts) is obtained by extrusion, and is then shaped by blow moulding in a mould. One-part moulding of the tank from a single parison gives good results.

This tank is advantageously equipped with a base plate or mounting plate (that is to say a support having substantially the shape of a plate) onto which at least one active accessory of the urea storage system and/or injection system is attached. This base plate generally has a perimeter, closed up on itself, of any shape. Usually, its perimeter has a circular shape.

In a particularly preferred manner, this base plate is a submerged mounting plate, i.e. that seals an opening in the lower wall of the tank. The expression "lower wall" is in fact understood to mean the lower half of the tank (whether or not it is moulded in one piece or from two parison sheets or cut-outs). Preferably, the base plate is located in the lower third of the tank, and more particularly preferably, in the lower quarter, or even squarely in the bottom of the tank. It may be partly on the lower side wall, in which case it is slightly slanted once mounted in the vehicle. The location and/or direction of the base plate especially depends on the location of the tank in the vehicle, and on the space occupied around it (considering the components to be integrated therein).

This base plate therefore incorporates at least one component that is active during storage and/or injection. This is understood to mean that the component is attached to or produced as one part with the base plate. This component may be incorporated inside the tank, or on the outside with, if necessary, a connection (delivery tube) passing through it.

Preferably, the base plate according to this variant of the invention integrates several active storage and/or metering components and, more particularly preferably, it integrates all the active components which are brought to be in contact with the liquid additive found in, leaving from or arriving into the additive tank.

Preferably, the component is chosen from the following elements: a pump; a level gauge; a temperature sensor; a quality sensor; a pressure sensor and a pressure regulator.

One advantage of flexible heaters is that, due to their flexibility, they can easily be inserted into cavities of any shape (which may be inside or outside the internal volume of the tank and/or its base plate) and while substantially conforming to the walls, even when following a tortuous path. Furthermore, they may have any shape, possibly even a complicated shape, so that a single heater (designed according to a sort of "pattern") may be used to heat various parts of the tank, even parts that are distant from one another.

It is worth noting that in case the wording of the present application would be ambiguous, we confirm by the present sentence that the aspects described above and which are also advantageous outside the scope of the presently claimed invention, constitute inventions per se, which might later on be claimed independently.

The invention claimed is:

1. A method for manufacturing a flexible heater, the method comprising:
    enclosing at least one resistive track in two sheets of electrically insulating plastic material;
    making a connection by connecting electrical wires to exposed electrical connections of the at least one resistive track;
    using a mould so as to define a leak tight space or cavity around the connection;
    injecting a liquid casting formulation into the mould;
    curing the liquid casting formulation; and
    removing the mould,
to form the flexible heater comprising the at least one resistive track enclosed in the two sheets of the electrically insulating plastic material, wherein the at least one resistive track comprises the electrical connection to which the electrical wires are connected.

2. The method according to claim 1, wherein the two sheets of electrically insulating plastic material are formed from a silicone composition.

3. The method according to claim 2, wherein the flexible heater comprises at least one stainless steel resistive track sandwiched between two silicone resin sheets.

4. The method according to claim 1, wherein the flexible heater comprises at least two resistive tracks which are interdigitated.

5. The method according to claim 1, wherein the flexible heater comprises at least one metal resistive track with perforations which are filled with the electrically insulating plastic material so as to interconnect the two sheets of electrically insulating plastic material.

6. The method according to claim 5, wherein the perforations have a diameter of less than 1 mm but at least equal to a surface tension of an acid used for etching a metallic foil.

7. The method according to claim 5, wherein a soldering area of the at least one metal resistive track comprises the perforations.

8. The method according to claim 1, wherein the liquid casting formulation is a liquid silicone composition.

9. The method according to claim 8, wherein the liquid silicone composition is formed from at least two components.

10. The method according to claim 1, wherein the liquid casting formulation is injected in the mould with a pump.

11. The method according to claim 1, wherein the injecting and the curing of the liquid casting formulation occur on a carrier, at such a speed so as to provide an adequate curing time.

12. The method according to claim 1, wherein the liquid casting formulation is injected in the mould with a pump employing an endless piston principle.

* * * * *